United States Patent [19]

Schmitt

[11] 4,172,586

[45] Oct. 30, 1979

[54] FLAME CUTTING MACHINE

[75] Inventor: Ewald Schmitt, Maintal, Fed. Rep. of Germany

[73] Assignee: Messer Griesheim GmbH, Frankfurt am Main, Fed. Rep. of Germany

[21] Appl. No.: 924,745

[22] Filed: Jul. 14, 1978

[30] Foreign Application Priority Data

Aug. 4, 1977 [DE]  Fed. Rep. of Germany ....... 2735072

[51] Int. Cl.² .............................................. B23K 7/02
[52] U.S. Cl. ....................................... 266/48; 266/50; 266/67
[58] Field of Search ............................. 266/48, 50, 67

[56] References Cited

U.S. PATENT DOCUMENTS

| | | | |
|---|---|---|---|
| 3,584,855 | 6/1971 | Ganga et al. | 266/50 |
| 3,692,292 | 9/1972 | Rokop et al. | 266/50 |
| 3,901,491 | 8/1975 | Vertesi et al. | 266/50 |
| 3,955,804 | 5/1976 | Gallucci et al. | 266/50 |

*Primary Examiner*—W. Stallard
*Attorney, Agent, or Firm*—Connolly and Hutz

[57] ABSTRACT

A flame cutting machine for subdividing a steel strand or the like is constructed to be movable on rails on both sides of a roller table supporting the strand with a measuring roller for determining the linear measurement of the strand; the measuring roller is tilted on a lever affixed to the machine carriage and is unilaterally open with its axis being in a vertical disposition.

10 Claims, 6 Drawing Figures

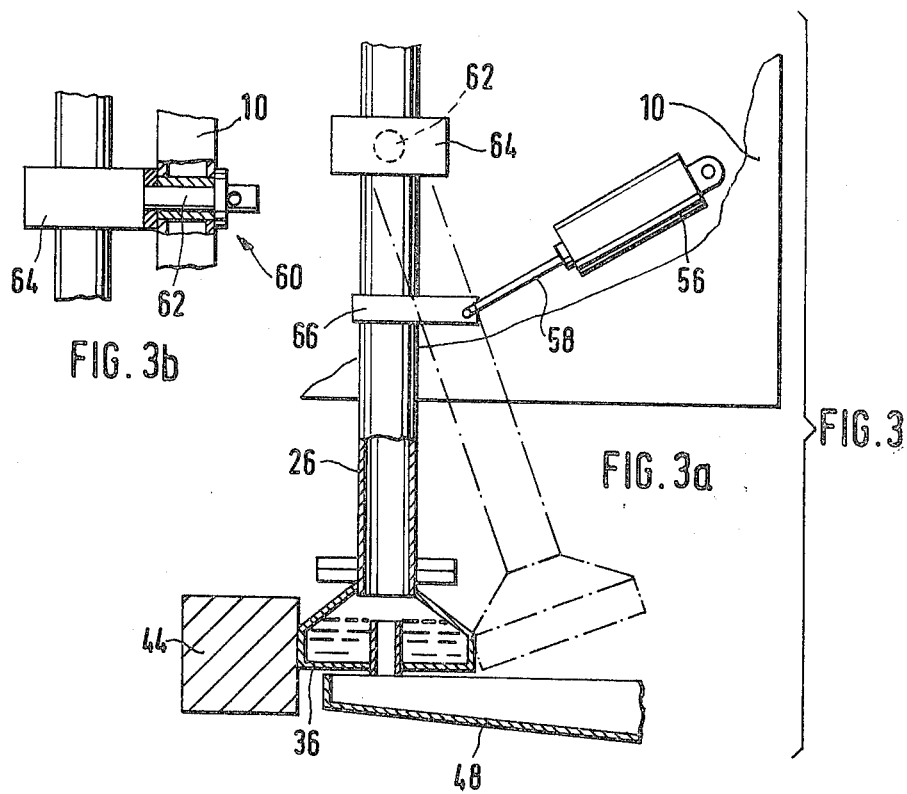
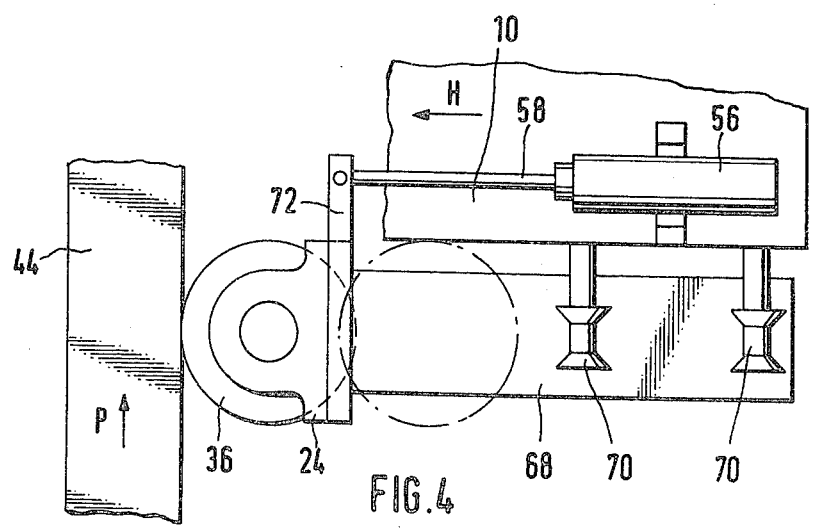

FLAME CUTTING MACHINE

BACKGROUND OF THE INVENTION

The present invention pertains to a flame cutting machine for the subdivision of a steel strand or the like, such as is a continuously cast strand, which is constructed so that it is movable on rails which are arranged on both sides of a roller table which takes up the strand, and with a measuring rollers for the linear measurment of the strand which is tilted on a lever affixed to the machine carriage.

It is common knowledge to use water-cooled measuring rollers for the measurement of the length of a steel strand or a portion thereof. In such practice the circumference of the measuring roller rolling on the workpiece is used for the determination of the strand length. Since for the measurement, the measuring roller lies directly against the hot, often still glowing steel strand, it is necessary to cool it, so that the roller diamter, which is subject to the influence of temperature, does not change, which would otherwise yield erroneous measurements.

A flame cutting machine of the aforementioned type is disclosed in the German patent (DT-PS) No. 2411972. The measuring roller associated with this flame cutting machine rolls over the top side of the strand to be measured.

It is also known to associate the measuring roller with the underside of the strand, as is shown e.g. in DT-Gbm 7511739. In this state of the art, furthermore, the measuring roller is unilaterally open, so that thereby the cooling water fed into the interior of the measuring roller can escape the roller directly without enforced reflux.

SUMMARY OF THE INVENTION

Proceeding from this state of the art it is the object of the present invention to create a flame cutting machine in which the constructive layout of the measuring roller on the machine and in relation to the strand to be measured is kept simple.

For accomplishing this object it is proposed, according to the invention, that the measuring roller be unilaterally open in a known manner, and that, furthermore, the axis of the measuring roller be set up in a vertical position. According to a preferred embodiment of the invention, the shaft which takes up the measuring roller is supported by at least one lever arm which is tilted on the machine carriage, and onto which an adjusting cylinder engages which is also affixed to the machine carriage.

For the formation of a compact structural unit of the linear measurement apparatus, it is further advantageous if an impulse transmitter is set up on the upper end of the shaft opposite the measuring roller. In order to prevent the water flowing out of the measuring roller, which according to the invention is set up laterally, from dispersing itself uncontrollably on the floor, an overflow pipe is provided on the underside of the measuring roller which extends into the roller interior and is connected with a collecting trough.

In a preferred embodiment of the invention it is further provided that the shaft (onto which the measuring roller is mounted) is tilted, and fastened to the adjusting cylinder by a mounting support.

Alternatively to this tiltable arrangement of the measuring roller in relation to the lateral surface which is to be measured of the strand, it is further proposed, according to the invention, that the measuring roller is connected with a sliding carriage which is displaceable by the piston of the adjusting cylinder. Through this construction, a linear displacement of the measuring roller—in contrast to the horizontal swing—is possible.

THE DRAWINGS

FIG. 3 (FIGS. 3(a) and 3(b)) illustrates the measuring roller arrangement in a second embodiment; and FIG. 4 illustrates the measuring roller arrangement in a third embodiment.

DETAILED DESCRIPTION

Figure 1:
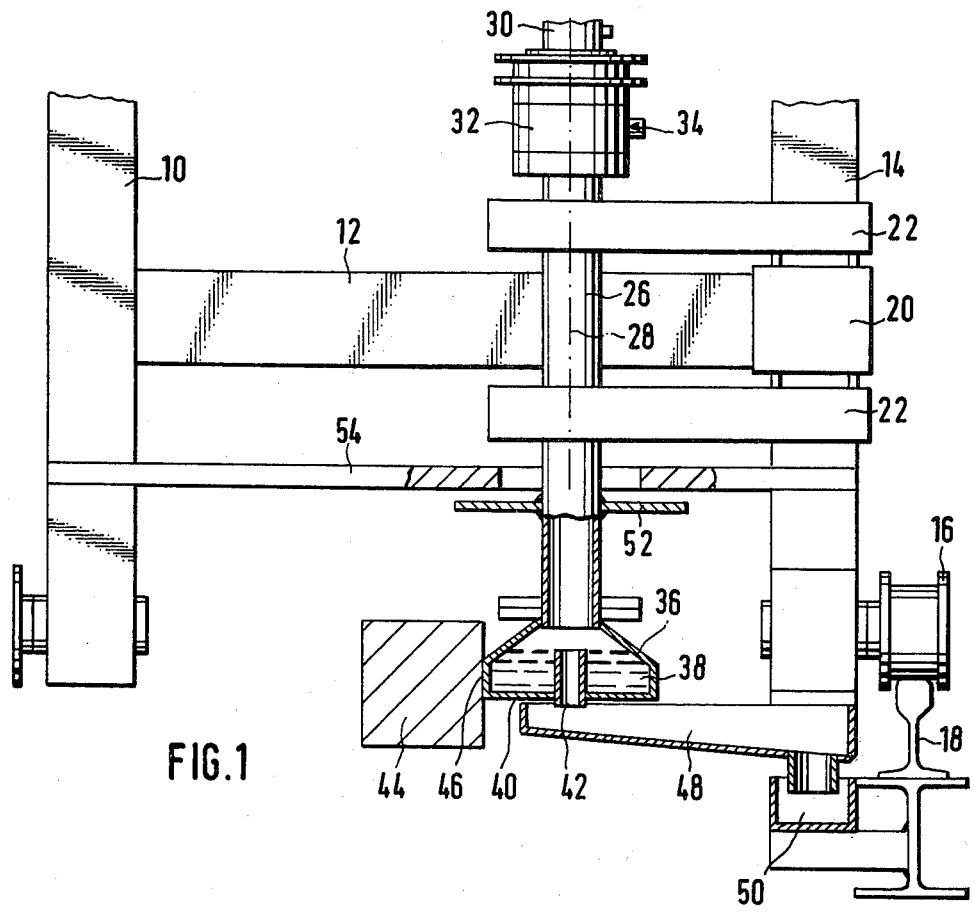
FIG. 1 is a side view of a part of a flame cutting machine, incorporating the invention.

A portion of a machine carriage 10 of a flame cutting machine, which is not shown, is illustrated in FIG. 1. The machine carriage is connected by a frame 12 with a side panel 14 of the machine, on whose lower end tread rollers 16 are arranged, by means of which the machine carriage, and thereby the flame cutting machine, is set up so that it is movable longitudinally on the rails 18.

As is obvious from the drawing, a bearing 20 is provided on the side panel 14, on both the upper and the underside of which a lever arm 22 is tilted. On the free end of each lever arm 22, a bearing yoke 24 is provided whose function is to take up and guide the shaft 26.

As FIG. 1 shows further, the shaft 26 is arranged so that its axis 28 runs in a vertical direction. An impulse transmitted 30, which is a component of the linear measurement apparatus, is assigned to the upper end of the shaft 26.

Between the impulse transmitted 30 and the upper lever arm 22 a rotary screw coupling 32 is set up on the shaft 26 through which cooling water is conducted into the interior of the hollow shaft 26 by means of a supply pipe 34.

A measuring roller 36 is flanged onto the lower end of the shaft 26 in FIG. 1. The measuring roller 36 has an interior 38 into which the cooling water flows which is conducted through the supply pipe 34 into the hollow shaft 26. As is also apparent from FIG. 1, an overflow pipe 42 is placed concentrically around the axis 28 on the underside 40 of the measuring roller 36. The upper end of the overlfow pipe 42 extends so far into the interior 38 that thereby the periphery 46 of the measuring roller 36, rolling on the strand 44, is completely cooled with water from the interior as is illustrated in FIG. 1.

A collecting trough 48 is associated with the overflow 42 through which the heated cooling water flowing out of the measuring roller is conducted to a longitudinal canal 50 which is parallel to a rail 18. From this longitudinal canal the water reaches the supply pipe 34 again by means of a pump with an interposed filted (not shown). Alternatively, however, the water can also of course be conducted out of this longitudinal canal 50 to a reservoir in which it cools down, and only then is used again for cooling purposes.

In order to prevent the heat emanating from the for most part still glowing steel strand 44 from having a disadvantageous effect on the suspension of the shaft 26 in the lever arm 22, a thermal shield 52 is provided on the shaft. Furthermore, on the lower lever arm 22 a protective shield 54 also watercooled is provided which extends from the machine carriage 10 to the side panel 14.

Figure 2:
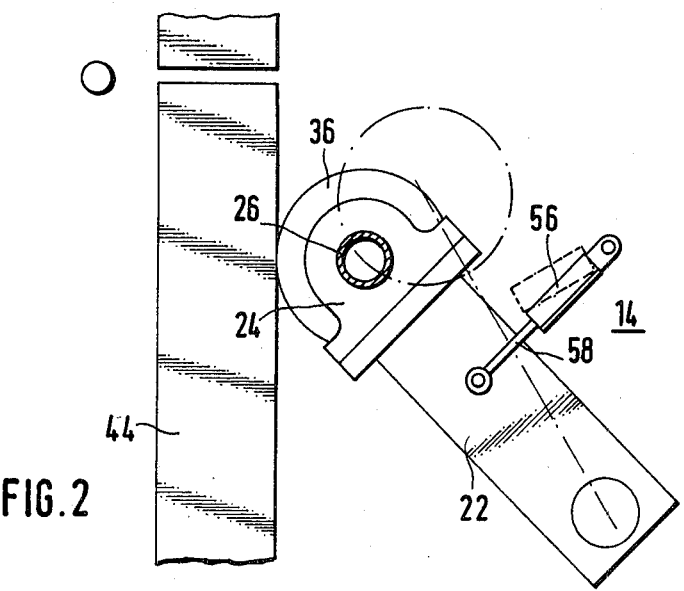
FIG. 2 is a partial top view of FIG. 1.

As mentioned previously, and also apparent from FIG. 2, the lever arms 22 are tilted on the bearing 20. An adjusting cylinder 56, set up on the side panel 14, whose piston rod 58 is hinged onto the lever arm 22. Through operation of the adjusting cylinder, e.g. through compressed air, the lever arm is swung out of its resting position, drawn in dashed lines, into the measuring position of the strand 44 which is drawn in full lines. Through the pressure exerted by the adjusting cylinder 56 it is ensured that the measuring roller 36 continuously lies against the vertical side surface of the strand 44 for the guarantee of an optimum measurement.

In FIG. 3, an additional embodiment of the invention is illustrated. As can be seen from the left partial view of this figure, a bearing 60 is set up on the machine carriage 10, on whose bearing pin 62 a mounting support 64 is provided. This mounting support acts moreover as a pivot bearing for the shaft 26 with the measuring roller 36 which is flanged onto the free end of the shaft. Through a second mounting support 66, the shaft 26 is connected to the piston rod 58 of the adjusting cylinder 56.

FIG. 3 shows in full lines the vertical measuring position of the measuring roller 36 in which it lies against the strand 44, i.e. is pressed against the strand by the adjusting cylinder 56. Through retraction of the piston rod 58 the measuring roller 36 is swung from this position back into its disengaged position around the bearing pin 62 drawn in dashed lines.

A third embodiment, according to the invention, is shown in FIG. 4. According to this variation, the measuring roller 36 is held by its bearing yoke 24 on a sliding carriage 68 which is movable at right angles to the direction of the strand motion. The sliding carriage 68 itself can be displaced by sliding on a lateral guide 70 which is also attached to the machine carriage 10.

On the free end of the piston rod 58 of the adjusting cylinder 56, an arm 72 is mounted through which the sliding carriage 68 are thereby the measuring roller 36 is shifted in horizontal direction (arrow H) against the vertical side surface of the strand 44.

The use of an adjusting cylinder which works pneumatically has the advantage that, in the case of possible lateral deviation of the strand 44 from its directional movement arrow P due to the flexibility of the adjusting cylinder 56 it is assured that the measuring roller 36 can make these lateral movements without, thereby, losing contact with the vertical side surface of the strand 44.

What is claimed is:
1. In a flame cutting machine for the subdivision of a steel strand or the like, which is constructed so that it is movable on rails which are arranged on both sides of a roller table which supports the strand, and with a measuring roller for the linear measurement of the strand, the measuring roller being tilted on a lever affixed to the machine carriage, the improvement being said measuring roller being mounted unilaterally open, and the axis of said measuring roller being disposed in a vertical position.

2. Flame cutting machine according to claim 1, characterized therein that the shaft on which said measuring roller is mounted is supported by at least one lever arm which can be tilted on said machine carriage, and an adjusting cylinder engages said lever arm, and said adjusting cylinder being affixed to said machine carriage.

3. Flame cutting machine according to claim 2, characterized therein, that an impulse transmitted is attached to the upper end of said shaft opposite said measuring roller.

4. Flame cutting machine according to claim 3, characterized therein, that on the underside of said measuring roller an overflow pipe is provided which extends into the roller interior and is connected with a collecting trough.

5. Flame cutting machine according to claim 4, characterized therein, that said shaft is tiltable and is fastened onto said adjusting cylinder by a mounting support.

6. Flame cutting machine according to claim 5, characterized therein that said measuring roller is connected with a sliding carriage which is displaceable by the piston of said adjusting cylinder.

7. Flame cutting machine according to claim 1, characterized therein, that an impulse transmitted is attached to the upper end of said shaft opposite said measuring roller.

8. Flame cutting machine according to claim 1, characterized therein, that on the underside of said measuring roller an overflow pipe is provided which extends into the roller interior and is connected with a collecting trough.

9. Flame cutting machine according to claim 2, characterized therein, that said shaft is tiltable and is fastened onto said adjusting cylinder by a mounting support.

10. Flame cutting machine according to claim 2, characterized therein that said measuring roller is connected with a sliding carriage which is displaceable by the piston of said adjusting cylinder.

* * * * *